United States Patent [19]

Sennott et al.

[11] 4,453,695

[45] Jun. 12, 1984

[54] HAIR DRYER MOUNT

[76] Inventors: Susan C. Sennott, 138 Sprague St., Dedham, Mass. 02026; Dorothy M. Mulligan, 12 Lyons Dr., Westwood, Mass. 02090; William J. Sennott, III, 138 Sprague St., Dedham, Mass. 02026; Richard T. Mulligan, 12 Lyons Dr., Westwood, Mass. 02090; Richard E. Barton, 187 Kent St., Scituate, Mass. 02066

[21] Appl. No.: 204,261

[22] Filed: Nov. 5, 1980

[51] Int. Cl.³ .............................................. F16M 1/00
[52] U.S. Cl. ..................................... 248/660; 248/278
[58] Field of Search ............ 248/280.1, 281.1, 316 R, 248/122, 123.1, 276, 278, 284, 282, 480, 103; 34/101

[56] References Cited

U.S. PATENT DOCUMENTS

| 273,857 | 3/1883 | Kirk | 248/276 |
|---|---|---|---|
| 543,328 | 7/1895 | Bertels | 248/316 R X |
| 759,925 | 5/1904 | Smith | 248/281.1 |
| 774,477 | 11/1904 | Jewett | 248/284 |
| 1,508,715 | 9/1924 | Norman | 248/316 R X |
| 1,591,791 | 7/1926 | Sprout | 248/123.1 |
| 2,204,508 | 6/1940 | Matthies | 248/160 |
| 2,689,995 | 9/1954 | Smith | 248/316 R |
| 3,402,908 | 9/1968 | Gill | 248/284 X |
| 3,749,294 | 7/1973 | Johnston | 248/316 R |
| 4,183,489 | 1/1980 | Copher | 248/122 |
| 4,225,106 | 9/1980 | Eplan | 248/309 R |

FOREIGN PATENT DOCUMENTS

| 457784 | 7/1949 | Canada | 248/284 |
|---|---|---|---|
| 145552 | 2/1931 | Switzerland | 248/276 |
| 553036 | 5/1943 | United Kingdom | 248/278 |

Primary Examiner—J. Franklin Foss
Attorney, Agent, or Firm—Donal B. Tobin

[57] ABSTRACT

A hair dryer mount for suspending a conventional hair dryer and permitting the flow of air to be directed in a desired direction while leaving the user's hands free. The hair dryer mount includes a wall bracket, extension arms and a support which includes a strap which fits around the hair dryer and holds the hair dryer in a nest. The nest is connected through a trunnion and yolk to the end of an extension arm to provide a wrist type joint. The extension arms and the support are connected together with adjustable friction couplings to provide sufficient friction among the parts so that the assembled mount may hold the hair dryer suspended about the user's head. The hair dryer may be moved from one position to another without adjustment of the mount.

8 Claims, 5 Drawing Figures

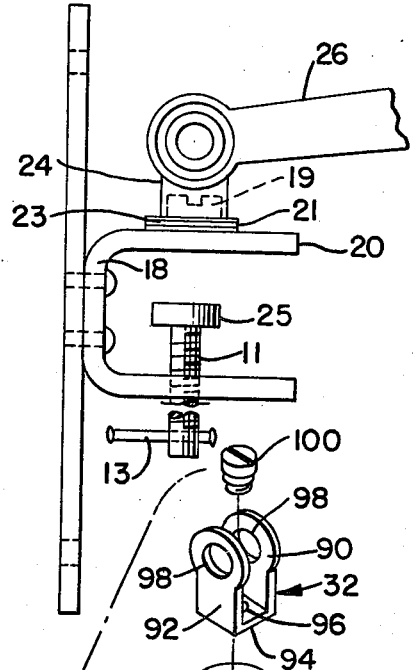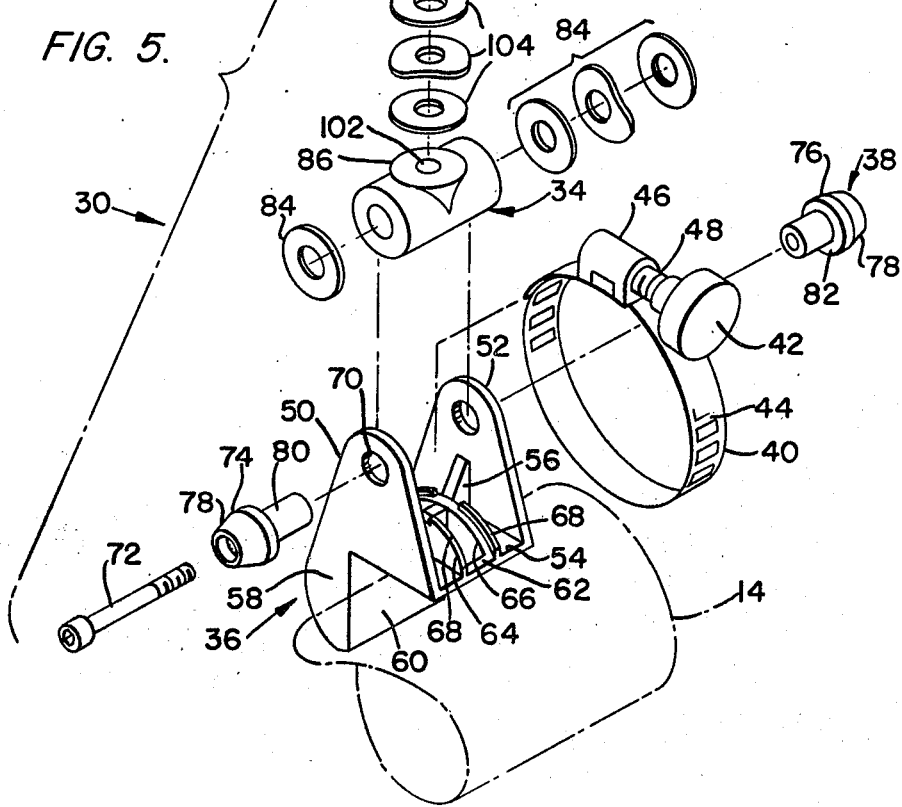

HAIR DRYER MOUNT

BACKGROUND OF THE INVENTION

The present invention relates to a hair dryer mount and more particularly to a hair dryer mount capable of supporting a variety of conventional hair dryers and permitting the flow of air to be directed in any desired direction while leaving the user's hands free.

There is a need for a mount which will hold a hair dryer and permit the air flow to be directed in any desired direction while the hands of the user are free to style and comb the hair. Usually when one uses a hair dryer, one holds the dryer in one hand and a comb or brush in the other and manipulates the hair dryer to direct the air flow through the hair from various positions so that all of the hair can be thoroughly dried. Most hair dryer users use the hair dryer to style the hair while it is being dried. Many hair styles require the use of both hands to hold the hair in proper position while it is being combed and brushed so that the desired styling can be achieved. This is easily accomplished if two people are involved in the styling; one person to hold the hair dryer and aim the direction of the flow and another person to style the hair. A fixed mount for the hair dryer does not provide a useful solution because the user must move the head with respect to the fixed mount. This makes the styling difficult because the position of the body must be frequently changed. It is also more difficult to use a mirror under these circumstances.

What is needed is a hair dryer mount that is able to accomodate a variety of different kinds of hair dryers and which can suspend the hair dryer in any position relative to the user's head. It is also necessary that the positon of the hair dryer and the direction of the flow may be easily changed from one position to another without having to disengage the support mechanism, move the hair dryer and then re-engage the mechaninsm. What is needed is a hair dryer mount that can be pushed from one position to another without need of adjusting the hair dryer support and which will stay in the desired position without further adjustment once it is put in place.

SUMMARY OF THE INVENTION

The hair dryer of the present invention fulfills these needs. The hair dryer mount will hold a conventional hair dryer suspended in any desired position about the user's head while the user's hands are free to style and comb the hair. The mount includes a bracket for attaching the mount to a fixed surface and extension arms extending into the use area. A special support is connected to the free end of the extension arm. The support provides a wrist type joint so that the hair dryer air flow may be directed in any desired direction. The support includes an adjustable strap which fits around the hair dryer and holds the hair dryer in a nest. The nest is connected to a trunnion and yolk by means of adjustable friction couplings which permit restrained rotation among the yolk, trunnion and nest to provide the wrist joint action. The extension arms are connected through similar friction couplings.

The assembled hair dryer mount holds the hair dryer suspended about the head of the user in any desired position with the air flow directed in any desired direction. The hair dryer may be pushed from one position to another without the need of adjusting the hair dryer mount components. When the hair dryer is moved to a new location and then released it will stay where it is placed. Thus the user will have both hands free to comb and style the hair while using the hair dryer.

These and other features and advantages of this invention will become apparent from the following description of certain embodiments thereof taken in conjunction with the drawings in which:

FIG. 4 shows a partial elevational view of the support yolk through which the hair dryer mount is connected to a wall support bracket; and FIG. 5 shows an exploded perspective view of the hair dryer support of the present invention.

DETAILED DESCRIPTION OF THE PREFERRED EMBODIMENT

Figure 1:
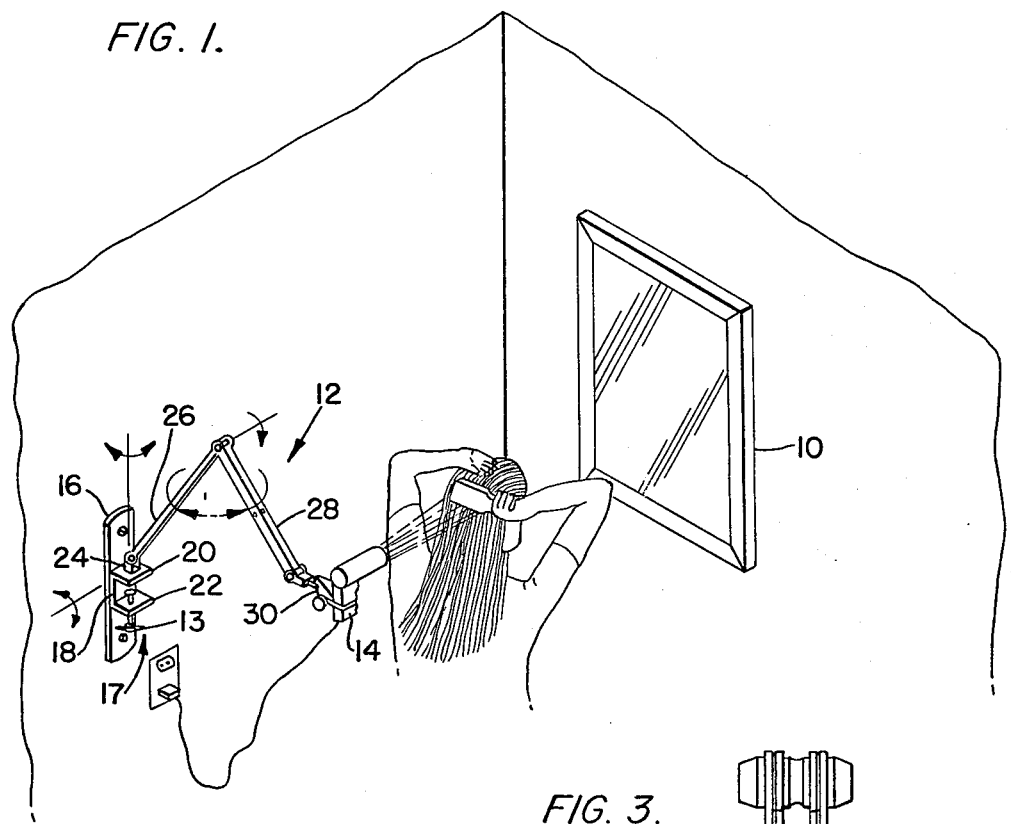
FIG. 1 shows a hair dryer supported from the hair dryer mount of the present invention as it would be used by someone styling the hair.

Referring now to FIG. 1 there is shown a person standing in front of a mirror 10 using the hair dryer mount 12 of the present invention while drying her hair. Hair dryer mount 12 holds the hair dryer 14 so that the person has both hands free to dry and style her hair. Hair dryer mount 12 may be mounted on a wall bracket 16 or clamped onto a table by means of a "C" clamp 17 with a vertical arm 18 and the two lateral arms 20 and 22. A standard clamp screw 11 is threaded into lateral arm 22 and has an associated clamp handle 13 and pad 15. Bolts 25 extend through enlarged bolt holes (not shown) into bracket 16. When bolts 25 are tight "C" clamp 17 is held tight to bracket 16. Slight loosening of bolt 25 permits "C" clamp 17 to be lifted and removed by sliding the clamp past the expanded bolt holes. The apparatus can then be easily clamped to a table.

A yolk 24 is mounted to the top of arm 20 through a friction coupling which permits yolk 24 to rotate on lateral arm 20. Yolk 24 is connected to one end of an extension arm 26 through a friction coupling which permits extension arm 26 to pivot with respect to yolk 24. As will be described in greater detail in connection with FIG. 5 the friction coupling may be adjusted to permit extension arm 26 to extend at any desired angle from yolk 24. The other end of extension arm 26 is pivotably mounted to one end of a second extension arm 28 through a similar friction coupling which may be adjusted to permit extension arm 28 to extend at any desired angle from extension arm 26. The other end of extension arm 28 is connected to an adjustable hair dryer support 30 through a similar friction coupling. Adjustable hair dryer support 30 is capable of holding almost any size hair dryer as will be described in greater detail in connection with FIG. 2 and FIG. 5. It will be seen that the user may fasten a hair dryer 14 in adjustable support 30 and then position the hair dryer mount so that the hair dryer air flow is directed in any desired direction. The yolk 24, extension arms 26 and 28 and adjustable support 30 are all movable with respect to one another but sufficiently frictionally engaged so that once the hair dryer is placed in a particular position by the user, the hair dryer will be held in that position by the hair dryer mount. To move the hair dryer to a different position, the user need only push the mount to a different position and pivot or swivel the various parts. Again, when the user lets go of the hair dryer it will stay suspended in the new position. One can easily see that the present invention provides a very useful hair dryer mount which can be quickly and easily moved without the need of adjusting any moving parts.

Figure 2:
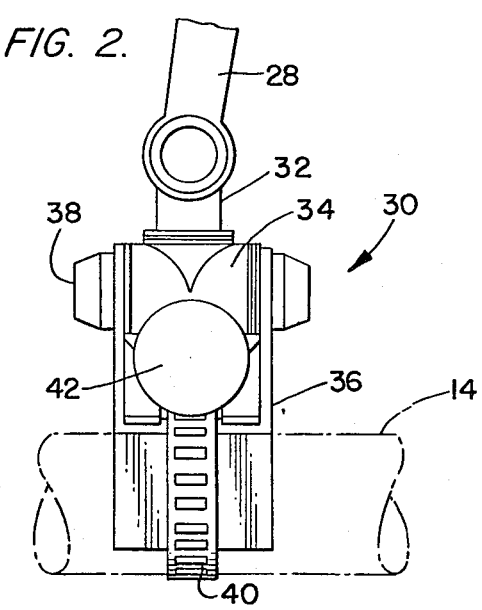
FIG. 2 shows the elevational view of the hair dryer support of the present invention.
Figure 3:
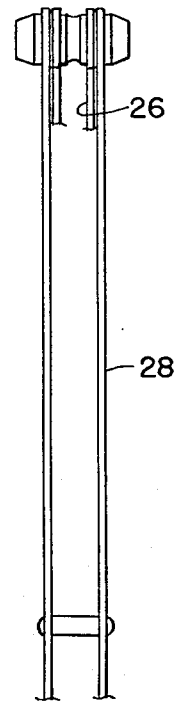
FIG. 3 shows a partial elevational view of the extension arm portion of the hair dryer mount.

Referring now to FIG. 2, the details of the adjustable support 30 of the present invention will be explained thoroughly. Extension arm 28 is coupled to yolk 32 through a frictional coupling similar to that used to connect extension arm 28 to extension arm 26. Yolk 32 is connected to trunnion 34 so that yolk 32 may pivot with respect to trunnion 34. Trunnion 34 is connected to nest 36 by a similar friction coupling 38 which permits the restrained rotation of nest 36 with respect to trunnion 34. Dryer 14 is held in nest 36 by means of an adjustable strap 40 adjusted by turning knob 42. It can be seen that yolk 32, trunnion 34 and nest 36 provide a universal or wrist type joint so that adjustable support 30 can pivot to place dryer 14 in any desired orientation.

As can be seen from FIG. 4 yolk 24 is connected to the end of arm 20 by means of a bolt 19 which threads into arm 20. Base 21 of yolk 24 is spaced apart from the opposing surface of lateral arm 20 by a number of washers 23, one of which is a spring washer which provides a desired friction for a friction coupling to control the rotation of yolk 24 with respect to lateral arm 20.

Referring now to FIG. 5, the construction and operation of support 30 will be described in greater detail. FIG. 5 shows an exploded perspective view of hair dryer support 30 including yolk 32, trunnion 34, nest 36, strap 40 and knob 42. The body of hair dryer 14 is shown in phantom. The body of hair dryer 14 is surrounded by strap 40. Strap 40 has a number of traverse slots for ridges 44 extending along its length. A housing 46 is affixed to one end of strap 40. The other end of strap 40 is passed through housing 46 to form a loop which surrounds dryer 14. Threaded shaft 48 extends from knob 42 into housing 46 in which it is supported for rotation. Housing 46 supports a worm gear (not shown) which is driven by turning knob 42 and threaded shaft 46. The worm gear threads engage slots or ridges 44 so that when knob 42 is turned the loop of strap 40 is tightened or loosened about dryer 14. Strap 40, housing 46 and knob 42 act like a radiator hose clamp commonly used in automobiles.

Nest 36 includes two upstanding walls 50 and 52 which extend from base 54 and are supported by webs 56. Each wall 50 and 52 has a lower extending portion 58 which extends below base 54. Lower extending portions 58 are connected by a transverse wall 60 extending at a sharp angle preferably about 90 degrees to base 54. Base 54 and transverse wall 60 form a "V" block against which the hair dryer 14 is nested. The use of this "V" block permits nest 36 to accommodate dryers of various sizes. Alternatively, one could use a fluted, knurled or other high friction curved surface to hold hair dryer 14 against nest 36 instead of a "V" block.

Extending from base 54 into the space defined by walls 50 and 52 is a curved guide 62 for strap 40. Guide 62 has two spaced apart rails 64 and 66 curving through the U-shaped portion of nest 36 about a center of curvature below base 54. The edge of rail 64 and 66 closest to their respective adjacent walls 50 and 52 include a lip 68 which forms a side wall for guide 62 and which confines strap 40 to prevent it from sliding off the guide. The flange formed by lips 68 is just slightly wider than the width of strap 40.

Thus, with strap 40 mounted in guide 62 and opened wide by turning knob 42, dryer 14 may be placed within the loop of strap 40. Strap 40 is then tightened to secure dryer 14 against the "V" block formed by transverse wall 60 and base 54 of nest 36.

The ends of walls 50 and 52 removed from base 54 include coaxially aligned bores 70 for accommodating friction coupling 38. Friction coupling 38 includes threaded bolt 72 and bored end caps 74 and 76. Each end cap 74 and 76 includes a head portion 78 and a sleeve portion 80. The outed diameter of sleeve portion 80 is smaller than that of head portion 78 so that a bearing surface 82 is provided to bear against the respective outer surface of wall 50 or 52. The head portion 78 of end cap 74 has a counter sunk bore for accepting the head of screw 72. The head portion of end cap 76 includes cooperative threads for accepting the threads of bolt 72. The sleeve portion of end caps 74 and 76 have a clearance fit with bores 70 of walls 50 and 52.

Trunnion 34 is a generally cylindrical piece having an axial bore extending therethrough which will accept sleeve portion of end caps 74 and 76 in a clearance fit. Trunnion 34 is assembled between the inside opposed surfaces of walls 50 and 52 by inserting end caps 74 and 76 through bores 70 into the axial bore of trunnion 34. Bolt 72 then extends through end cap 74 and trunnion 34 and screws into end cap 76. Suitable washers 84, one of which is a curved spring washer, are provided between bearing surface 82 of end caps 74 and 76 and the opposing bearing surfaces of 50 and 52. By adjusting the tightness of bolt 72, one can vary the amount by which the spring washer is compressed to adjust the amount of restrained rotation permitted between trunnion 34 and nest 36 so that nest 36 may hold hair dryers of different weights without having nest 36 slip with respect to trunnion 34.

Trunnion 34 also includes a turret section 86 which extends in a direction generally perpendicular to the axis of cylindrical trunnion 34. Turret 86 is substantially cylindrical and provides a flat surface against which yolk 32 may be supported. Yolk 32 includes two upstanding wall sections 90 and 92 and a transverse base 94. Walls 90 and 92 have aligned bores 98 extending respectively therethrough to permit yolk 32 to be connected to the end of extension arm 28 by means of a frictional coupling similar to frictional coupling 38 described above.

Base 94 has a bore 96 extending therethrough to permit yolk 32 to be connected to turret 86 by means of screw 100. Screw 100 is accepted into cooperative threads in bore 102 of turret 86. Washers 104, one of which is a curved spring washer, are places between the bearing surfaces of yolk base 94 and turret 86 to permit yolk 32 to rotate freely with respect to turret 86. Thus it can be seen that yolk 32, trunnion 34 and nest 36 provide a universal wrist type joint to permit hair dryer 14 to be placed in any desired orientation so that the air flow may be directed in any desired direction.

It can be seen that the present invention provides a hair dryer mount that will easily accept various hair dryers and hold them in a fixed position so that their air flow may be directed as desired by the user. The position of the hair dryer may be easily changed without adjusting the mount. When the hair dryer is moved to a new location and then released it will stay where it is placed. Thus the user will have both hands free to comb and style the hair while using the hair dryer.

While this invention has been described and disclosed in connection with its preferred embodiment, those skilled in the art will recognize that various alterations and modifications may be made to the preferred embodiment without departing from the scope of the present invention. Thus, it is intended that the scope of the present invention not be limited except as set forth in the following claims:

We claim:

1. A hair dryer mount for suspending a hair dryer about the head of a user and freely positionable and repositionable for directing the hair dryer air flow in a desired direction comprising:

an adjustable support including;

a U-shaped yoke having a pair of upstanding arms, and having a base connecting said upstanding arms and having a bore through said base;

a generally cylindrical trunnion having coaxially aligned bores extending from the opposite end surfaces thereof into said cylindrical trunnion, said trunnion including a turret section extending from the sides of said trunnion and having a bearing surface for supporting the base of said yoke;

said turret bearing surface having a bore extending therefrom into said turret section;

a fastening means extending through said yoke base bore and into said turret section for connecting said yoke to said turret section and permitting rotational motion therebetween;

a nest having a base and two upstanding walls extending from said base and forming a U-shape, said walls spaced apart sufficiently to accommodate said cylindrical trunnion therebetween;

said nest walls having bores extending therethrough aligned with said cylindrical trunnion bores;

a guide extending across said nest base substantially parallel to said nest walls and curving about a center of curvature below said nest base;

means depending from the bottom of said nest base for engaging the hair dryer;

adjustable clamping means extending through said nest between said upstanding walls and along said guide and looping below said nest base for adjustably engaging the hair dryer; and, adjustable frictional coupling means extending through said bores in said upstanding nest walls and into said cylindrical trunnion bores for adjustably tightening said trunnion and said nest together to permit restrained rotation therebetween;

whereby said yoke, said trunnion and said nest provide a freely rotatable wrist type joint capable of rotation about the axis of the trunnion and the axis of the trunnion turret to permit the air flow of the hair dryer to be directed in a desired direction.

2. The hair dryer mount in claim 1 further including a first extension arm frictionally coupled to said yoke to permit restrained rotation between said yoke and said first extension arm;

a second extension arm having a first end frictionally connected to the second end of said first extension arm and having a second end;

a second yoke frictionally connected to the second extension arm; and, a wall bracket operatively connected to said second yoke for attaching said hair dryer mount to a fixed surface.

3. The hair dryer mount of claim 2 wherein said wall bracket includes a "C" clamp removeably affixed to said wall bracket for portable connection to a fixed surface.

4. The hair dryer mount of claim 1 wherein said trunnion bores extend completely axially through said trunnion.

5. The hair dryer mount of claim 1 further including at least one washer disposed between said yoke and said turret section bearing surface to facilitate rotation therebetween.

6. The hair dryer mount of claim 1 wherein said means for holding said hair dryer against said nest base includes a lower extending portion extending from each of said nest walls below said nest base and a transverse wall section extending across said nest base between said lower extending portions, said transverse wall forming a large angle with said nest base to provide a "V" block for securing said hair dryer against said nest.

7. The hair dryer mount of claim 1 wherein said guide includes first and second side rails extending along said nest base between said nest walls and spaced apart from each other and from the adjacent nest wall; and, a lip extending along the edge of said rail closest to its adjacent upstanding wall for providing, with its corresponding rail, a flange for accepting said clamping means.

8. The hair dryer mount of claim 1 wherein said clamping means includes an elongated strip having a plurality of transverse slots equally spaced along its length;

said strap adapted to rest in said nest guide and loop about said nest base;

a housing fixed to one end of said strap and adapted to permit the other end of said strap to fit through said housing to form said strap into a loop; and, a knob having a threaded shaft extending therefrom into said housing;

the threads of said shaft engaging the slots on said looped strap whereby when said knob is turned said threads engage said transverse slots in said strap and open or close said strap loops.

* * * * *